US007006882B2

(12) United States Patent
Chang et al.

(10) Patent No.: US 7,006,882 B2
(45) Date of Patent: Feb. 28, 2006

(54) MACHINE CONTROL SYSTEM

(75) Inventors: Da-Yi Chang, Hsinchu (TW); Kuei Yi Liu, Kaohsiung (TW); Chi Yung Liu, Hsinchu (TW)

(73) Assignee: Macronix International Co., Ltd., Hsinchu (TW)

( * ) Notice: Subject to any disclaimer, the term of this patent is extended or adjusted under 35 U.S.C. 154(b) by 196 days.

(21) Appl. No.: 10/754,370

(22) Filed: Jan. 9, 2004

(65) Prior Publication Data
US 2004/0225402 A1 Nov. 11, 2004

Related U.S. Application Data

(60) Provisional application No. 60/468,323, filed on May 6, 2003.

(51) Int. Cl.
G06F 19/00 (2006.01)
(52) U.S. Cl. .............................. 700/96; 700/19; 700/28; 703/13; 705/80
(58) Field of Classification Search .................. 700/96, 700/28, 19; 703/13, 17; 705/53, 80
See application file for complete search history.

(56) References Cited

U.S. PATENT DOCUMENTS

| 5,872,958 | A  | * | 2/1999  | Worthington et al. | ........ 703/13  |
| 6,427,140 | B1 | * | 7/2002  | Ginter et al.      | ................. 705/80 |
| 6,859,675 | B1 | * | 2/2005  | Kim                | ............ 700/108 |
| 2002/0026514 | A1 | * | 2/2002  | Ellis et al.     | .................. 709/227 |
| 2004/0177060 | A1 | * | 9/2004  | Nixon et al.    | ................... 707/3 |
| 2004/0225390 | A1 | * | 11/2004 | Keller et al.   | .................. 700/95 |

OTHER PUBLICATIONS

*What's IBM SiView Strandard.* IBM Japan [online]. [retrieved on May 4, 2004]. Retrieved from the Internet: <URL: http://www-6.ibm.com/jp/iisc/english/po/siview/about.html>.
*Characteristic of IBM SiView Standard.* IBM Japan [online]. [retrieved on May 4, 2004]. Retrieved from the Internet: <URL: http://www-6.ibm.com/jp/iisc/english/po/siview/merit.html>.
Malaysia's 1st Silicon foundry taps IBM's MES software to run startup fab. Silicon Strategies, Jul. 7, 2000 [online]. [retrieved on May 4, 2004]. Retrieved from the Internet: <URL: http://www.siliconstrategies.com/article/printable Article.jhtml?articleID=10813254>.

* cited by examiner

*Primary Examiner*—Leo Picard
*Assistant Examiner*—Sheela Rao
(74) *Attorney, Agent, or Firm*—Knobbe, Martens, Olson & Bear, LLP

(57) ABSTRACT

The invention is related to methods and apparatus that advantageously provide compatibility between two or more different computer systems, such as computers used in a manufacturing environment, e.g., a foundry for semiconductor fabrication. For example, a first computer system with a first operating system, such as OS/2® from IBM Corporation, and a second computer system with a second operating system, such as Windows® NT® from Microsoft Corporation. In one embodiment, a transfer module permits an application that executes in the IBM® OS/2® operating system access to files maintained in a component object model (COM+) format from Microsoft Corporation. A routing module transfers data to and from a module with functions created in the component object model (COM+) format. One embodiment of the routing module routes data according to one of four selectable processing paths termed TAPCOM, COMTAP, TAPCOMTAP, and COMTAPCOM.

24 Claims, 7 Drawing Sheets

MACHINE CONTROL SYSTEM

RELATED APPLICATION

This application claims the benefit under 35 U.S.C. § 119(e) of U.S. Provisional Application No. 60/468,323 filed May 6, 2003, the entirety of which is hereby incorporated by reference.

BACKGROUND OF THE INVENTION

1. Field of the Invention

The invention generally relates to computer software. In particular, the invention relates to software that permits the efficient adding of functions to the control for machines in a manufacturing process.

2. Description of the Related Art

Computers are often used to automate processes, such as processes that are used in factories. However, a very wide variety of configurations, operating systems, and programming languages are possible for a computer. A typical software user or even a typical software developer is not proficient in every possible computer language and/or operating system that is available. Thus, a software developer often has to develop software on an unfamiliar machine or unfamiliar operating system. This is both time consuming and an inefficient use of resources.

Often, incompatible computer systems co-exist with each other in the same environment. For example, a manufacturing environment can include a mix of relatively new computer systems and relatively old computer systems. What is needed is a way to improve the compatibility of various computer systems.

SUMMARY OF THE INVENTION

Embodiments of the invention advantageously provide a new architecture, which can accelerate the speed of updating the functions of the system. Moreover, embodiments of the invention can also provide compatibility between two or more different computer systems, such that those that are familiar with one computer system can efficiently use another computer system. For example, a first computer with a first operating system, such as OS/2® from IBM Corporation, and a second computer with a second operating system, such as Windows® NT® from Microsoft Corporation. In one embodiment, a transfer module permits an application that executes in the IBM® OS/2® operating system to access files maintained in a component object model (COM+) format from Microsoft Corporation.

One embodiment of the invention advantageously includes a routing module. The routing module transfers data to and from a module with functions created in the component object model (COM+) format. For example, one embodiment of the routing module uses four selectable processing routes termed TAPCOM, COMTAP, TAPCOMTAP, and COMTAPCOM. The TAPCOM processing route corresponds to data flow in one direction from a TAP module to the component object model (COM+) module. The COMTAP processing route corresponds to data flow in one direction from the component object model (COM+) module to the TAP module. The TAPCOMTAP processing route corresponds to data flow from the TAP module, to the component object model (COM+) module, and back to the TAP module. The COMTAPCOM processing route corresponds to data flow from the component object model (COM+) module, to the TAP module, and back to the component object model (COM+) module.

BRIEF DESCRIPTION OF THE DRAWINGS

These and other features of the invention will now be described with reference to the drawings summarized below. These drawings and the associated description are provided to illustrate preferred embodiments of the invention and are not intended to limit the scope of the invention.

DETAILED DESCRIPTION OF PREFERRED EMBODIMENTS

Although this invention will be described in terms of certain preferred embodiments, other embodiments that are apparent to those of ordinary skill in the art, including embodiments that do not provide all of the benefits and features set forth herein, are also within the scope of this invention. Accordingly, the scope of the invention is defined only by reference to the appended claims.

Manufacturing environments, such as factories, frequently use automation. Automation is relatively common where the processing steps performed within the manufacturing environment include relatively many production processes performed by machines. One example of a relatively highly automated manufacturing environment is a foundry for semiconductor fabrication. While illustrated in the context of semiconductor fabrication and the IBM® OS/2® and Microsoft® Windows® operating systems, the skilled artisan will appreciate that the principles and advantages described herein are applicable to other types of automated manufacturing environments, such as automobile manufacturing, food processing, pharmaceutical manufacturing, and the like, and to other operating systems.

Figure 1:
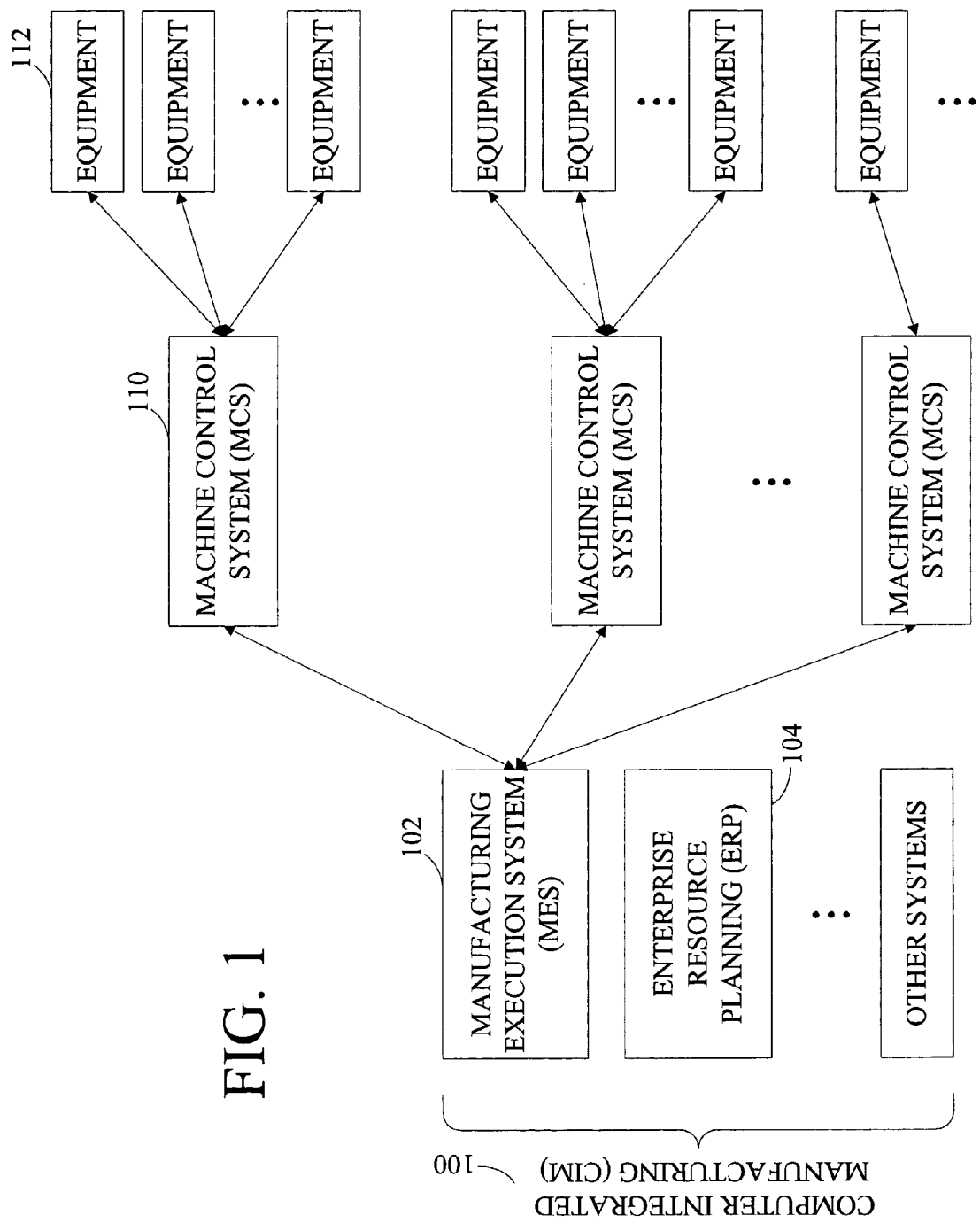
FIG. 1 illustrates an example of computer systems in use in a manufacturing environment.

FIG. 1 illustrates an example of computer systems in a manufacturing environment. Semiconductor fabrication foundries and other relatively complex manufacturing environments can include relatively many interacting computer systems. For example, a computer integrated manufacturing system (CIM) 100 for a foundry can include various systems, such as a manufacturing execution system (MES) 102, an enterprise resource planning (ERP) system 104, scheduling software, engineering systems, yield monitoring systems, and the like.

The manufacturing execution system (MES) 102 controls the production process at a top level. A commercially-available example of the manufacturing execution system (MES) 102 is SiView Standard from IBM Corporation. Typically, a foundry includes relatively few manufacturing execution systems. For example, a foundry can be operated with only one manufacturing execution system (MES). In one embodiment, the manufacturing execution system (MES) 102 corresponds to a central computer system that controls the manufacturing system for an entire foundry. However, it will be understood that the manufacturing execution system (MES) 102 can also be distributed and that more than one manufacturing execution system (MES) 102 can be used to control a foundry.

The manufacturing execution system (MES) 102 can be coupled to one or more machine control systems. In turn, a machine control system (MCS) 110 can be coupled to one or more pieces of manufacturing equipment 112. Further details of the machine control system (MCS) 110 will be described later in connection with FIG. 2. The ERP system 104 can integrate business activities such as planning, sales, inventory control, order tracking, and the like.

Machine Control System (MCS) 110

Figure 2:
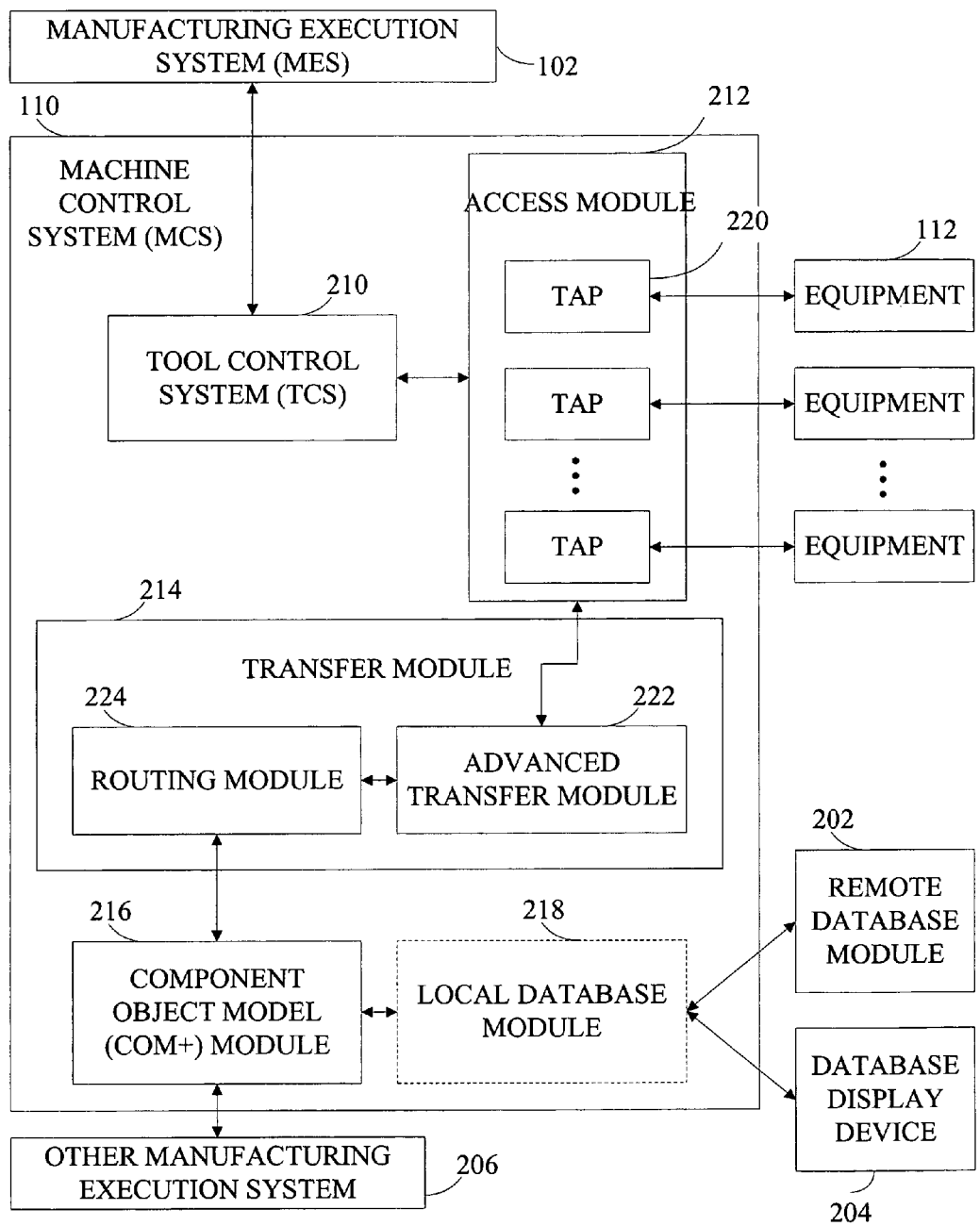
FIG. 2 illustrates an architecture of a machine control system (MCS) according to an embodiment of the invention.

FIG. 2 illustrates an architecture of the machine control system (MCS) 110 according to an embodiment of the invention. Relatively many machine control systems can be present in a manufacturing environment. In one embodiment, the machine control system (MCS) 110 corresponds to a local computer system that communicates with the manufacturing execution system (MES) 102 and controls the operation of corresponding manufacturing equipment 112. Disadvantageously, the machine control system (MCS) 110 can be configured to operate on a legacy operating system, such as IBM® OS/2®, which may not be familiar with relatively inexperienced software developers.

In the illustrated embodiment of FIG. 2, the machine control system (MCS) 110 is coupled to the manufacturing execution system (MES) 102, to one or more manufacturing equipment 112, to a remote database module 202, to a database display device 204, and to other manufacturing execution systems 206 as applicable. It will be understood that the machine control system (MCS) 110 and other systems illustrated in FIG. 1 can also be coupled to further systems or to fewer systems than shown.

The illustrated machine control system (MCS) 110 includes a tool control system (TCS) 210, an access module 212, a transfer module 214, a component object model (COM+) module 216, and a local database module 218. As will be appreciated by one of ordinary skill in the art, it can be desirable to change production processes to produce new devices, to improve yield, to speed production, to accommodate changes in equipment and so forth. Embodiments of the invention include machine control systems that can advantageously be modified and/or updated in a relatively fast and efficient manner.

The tool control system (TCS) 210 corresponds to an application program that is used by the machine control system (MCS) 110 to communicate with the manufacturing execution system (MES) 102. The tool control system (TCS) 210 permits the manufacturing execution system (MES) 102 to communicate with the manufacturing equipment 112 coupled to the machine control system (MCS) 110. In one embodiment, the tool control system (TCS) 210 is operated under an operating system other than Microsoft® Windows®, such as, for example, IBM® OS/2®.

The Access Module 212

The access module 212 includes one or more TAP modules 220. The TAP module 220 can correspond to an interpreter for the tool control system (TCS) 210 and interprets source code that is provided by the manufacturing equipment 112. In one embodiment, a corresponding TAP module 220 exists for each piece of manufacturing equipment 112. For example, the TAP module 220 can correspond to the TTCORTAP.DLL file from IBM Corporation. The TTCORTAP.DLL corresponds to a dynamic link library file, which can provide functions and/or data to another application, such as the tool control system (TCS) 210, via a static or a dynamic link to the DLL file. The TAP modules 220 thereby configure, control, and monitor the manufacturing equipment 112. In one embodiment, the TAP module 220 corresponds to source code files with a "tap" file extension. A wide variety of manufacturing equipment 112 can be coupled to the TAP modules 220. The following is a non-exhaustive list that illustrates examples of equipment that can be coupled to the TAP modules 220 in the context of a semiconductor foundry: a robot arm for automatically moving/transferring wafer lots among equipment; a track for coating photoresist on a wafer and developing a desired pattern; a stepper for exposure of the desired pattern; a Deep UV machine for exposure of the desired pattern; a scanner also for exposure of the desired pattern; a doping implantation machine for implanting ions, a furnace for thermal oxidation; an etcher for etching material; and so forth.

In one conventional machine control system (MCS), modifications and/or updates to the code are implemented within the TAP modules. In one embodiment, the TAP modules 220 correspond to modules of source code that are interpreted by the access module 212. In another embodiment, the TAP modules 220 can include compiled code. The TAP modules can be relatively difficult to program compared to programming with component object models (COM or COM+), which results in relatively inefficient software development. In one conventional system, the conventional machine control system (MCS) is placed in an inoperative state while changes are being made to a TAP module. This not only makes the software more expensive to develop, but can also undesirably render the entire machine control system (MCS) unavailable for use for extended periods of time including, for example, coding, testing, and debugging periods.

Embodiments of the invention limit the modification of code in the TAP modules 220 to relatively simple code, thereby advantageously simplifying software development and minimizing downtime of the machine control system (MCS) 110. The relatively simple code in the TAP modules 220 references functional code in the component object model (COM+) module 216. For example, in one embodiment, source code in the modified TAP module 220 is modified by adding one or more lines of code with a keyword, such as "FUNCTION." When the access module 212 encounters the keyword in the code, the access module 212 defers execution of the instruction and/or parameters to the transfer module 214 for further processing. In the illustrated embodiment of the invention, the transfer module 214 includes an advanced transfer module 222 and a routing module 224, which will be described in greater detail later. When the access module 212 encounters the keyword in the code and/or parameter of the TAP module 220 that indicates that further processing is to be performed by the component object model (COM+) module 216, the access module 212 links to the transfer module 214 (via the advanced transfer module 222 and the routing module 224), and to the component object model (COM+) module 216. In one embodiment, this permits downtime for the machine control system (MCS) 110 to be advantageously reduced to the relatively short amount of time that it takes to add the keyword and related parameters to the applicable TAP module 220 and to restart the machine control system (MCS) 110. An example of using the access module 212 is described in greater detail later in connection with FIG. 3.

The Transfer Module 214

The transfer module 214 includes functions and/or data that can be accessed by the function calls and the like embedded in the source code of the TAP modules 220. In a conventional machine control system (MCS), a conventional transfer module can correspond to a TTURTAP.DLL file. In the illustrated embodiment of the invention, the transfer module 214 includes the advanced transfer module 222 and the routing module 224, both of which will be described in greater detail later.

The following examples illustrate some of the types of functions that can be written in the source code of the TAP module 220. For example, the TAP module 220 can be configured to communicate with the underlying operating system. The TAP module 220 can further be configured to communicate with the manufacturing execution system (MES) 102 via the tool control system (TCS) 210 to receive commands and to provide status. The TAP module 220 can be configured to control and to receive status from the manufacturing equipment 112. The TAP module 220 can also be configured to perform computations. These computations can be coded in the TAP module 220 or can be coded in the component object model (COM+) module 216, and then referenced in the TAP module 220. The TAP module 220 can also be configured to provide computations to another computer system, such as to another manufacturing execution system 206.

The Component Object Model (COM+) Module 216

In one embodiment, the software developer creates or modifies source code in the appropriate file in the component object model (COM+) while the machine control system (MCS) 110 is still operating, thereby advantageously reducing downtime for the machine control system (MCS) 110. After the modifications to the source code have been made, the software developer can shut down operation of the machine control system (MCS) 110, can modify the TAP module to incorporate the appropriate reference, e.g., a "FUNCTION" call reference and related parameters (or copy a source code file that was modified offline to the TAP module), and restart the machine control system (MCS) 110 or restart the access module 212 to load the reconfigured TAP module.

In the illustrated embodiment, the component object model (COM+) module 216 processes code that is formatted in a component object model (COM or COM+) format from Microsoft Corporation. The component object model defines a binary standard for objects and interobject communication. The component object model (COM+) module 216 can include DLL files, executable files, and combinations of both. Such standardization advantageously permits a software developer to efficiently utilize relatively more time coding actually functional code and relatively less time writing code for routine tasks, such as code for initialization, code that moves data around, code for interfacing with the operating system, and the like. Moreover, a contemporary format, such as the component object model (COM or COM+) format can advantageously be supported by a relatively wide variety of programming tools and programming languages that are not available to a legacy system such as IBM® OS/2®. Example of such programming tools and/or languages include Visual Basicg, Java, C++, and the like.

Disadvantageously however, a conventional computer system that executes an IBM® OS/2® is not capable of processing code written in the component object model format. As a result, software developers who update or modify code for a conventional computer system, such as a conventional legacy machine control system, write modifications and updates to the code in the native code executable by the legacy machine control system, such as code for the IBM® OS/2® operating system. For example, to modify the operation of a conventional machine control system (MCS), a software developer can modify source code that is executed by the tool control system (TCS) 210 or by the access module 212. For the access module 212, the source code can be present in the TAP module 220. Disadvantageously, source code for the TAP module 220 or for the transfer module 214 can include source code that interfaces with the IBM® OS/2® operating system, which can be a relatively difficult to write and unfamiliar to inexperienced software developers.

Embodiments of the invention advantageously permit software developers to efficiently develop code in a contemporary format, such as the component object model (COM or COM+) format from Microsoft, even for a legacy operating system, such as IBM® OS/2®. This advantageously permits the machine control system (MCS) 110 to be rapidly modified and/or updated in an efficient manner. In one example, functions related to calculations for statistical data, charts, or other analysis can advantageously be performed by the component object model (COM+) module 216. Although such executable code or even corresponding source code can be executed elsewhere in the machine control system (MCS) 110, the placement of the executable code in the component object model (COM+) module 216 advantageously places code, which may be modified later, in a relatively easily accessible portion of the machine control system (MCS) 110. For example, the executables in the component object model (COM+) module 216 can advantageously be modified while the machine control system (MCS) 110 is operating. Additional functions can be added to the executables in the component object model (COM+) module 216, and a function call can be added to a TAP module, which can advantageously limit the downtime associated with the machine control system (MCS) 110. In one embodiment, the component object model (COM+) module 216 is optionally further configured to communicate with other manufacturing execution systems 206 to share files and the like. This permits the component object model (COM+) module 216 to share and/or transfer source code with, for example, another foundry. Further details of the component object model (COM+) module 216 will be described in greater detail later in connection with FIGS. 5A and 5B.

The local database module 218 can be configured to store data, such as results, of computations of the component object model module. In one embodiment, the local database module 218 is optional. The local database module 218 can also be coupled to the remote database module 202 for remote storage of data and to the database display device 204 for examination of the data. The database display device 204 can correspond to computer monitors, printers, plotters, speakers, and the like. It will be understood that a machine control system (MCS) 110 can further be coupled to data input devices, such as keyboards, mouse devices, removable drives, and the like.

The Advanced Transfer Module 222 and The Routing Module 224

In the illustrated embodiment of the invention, the transfer module 214 includes the advanced transfer module 222 and the routing module 224. In one embodiment, the advanced transfer module 222 includes the functionality of a conventional transfer module and is also a DLL file. In addition, the advanced transfer module 222 should include additional functionality that permits the advanced transfer module 222 to retrieve additional functions and/or data via the routing module 224. This advantageously permits functions that are not present in the advanced transfer module 222 to be retrieved via the advanced transfer module 222, thereby permitting the TAP modules to access relatively more functions. In one embodiment, the advanced transfer module 222 accesses additional functions using the same keyword, e.g., "FUNCTION," that is used by the TAP module 220.

The routing module 224 transfers functions and/or data to and from the component object model (COM+) module 216, where the functions and data are stored. The component object model (COM+) module 216 can advantageously be implemented in a Microsoft® Windows® environment. The routing module 224 defines processing routes for functions and/or data accessed from the component object model (COM+) module 216. In one embodiment, the routing module 224 uses four processing routes, which are termed herein as follows: TAPCOM, COMTAP, TAPCOMTAP, and COMTAPCOM. In another embodiment, the routing module 224 uses fewer than four processing routes, such as, for example, one, two, or three processing routes selected from the group. In one embodiment, the routing module 224 is also implemented as a DLL file and executes in the IBM® OS/2® environment. The type of processing route can be identified by naming the processing route as a parameter to the function call in the TAP module 220. For example, a function call can include a keyword, e.g., "FUNCTION," and then can include a processing route, e.g., TAPCOMTAP, and then include the name of the desired function as well as any other pertinent data, such as a filename, the location of data, the size of data, etc.

The TAPCOM processing route corresponds to data flow in one direction from the TAP module 220 making the function call, through the advanced transfer module 222, through the routing module 224, and to the component object model (COM+) module 216. Storage of data into the local database module 218 or to the remote database module 202 and/or display of data with the database display device 204 are examples of when the TAPCOM processing route can advantageously be specified by the TAP module 220 making the function call. Data that is stored in the local database module 218 or in the remote database module 202 can be retrieved later for analysis. Processing of the TAPCOM processing route is described in greater detail later in connection with FIG. 4A.

The COMTAP processing route corresponds to data flow in one direction from the component object model (COM+) module 216 to the TAP module 220 making the function call. In one example, the data flow provided with the COMTAP processing route corresponds to an instruction that indicates to the TAP module 220 to stop the manufacturing equipment 112. For example, the component object model (COM+) module 216 can perform a calculation of when a process should stop, and the COMTAP processing route provides a way for the TAP module 220 to receive an indication from the component object model (COM+) module 216 of when to stop. In one embodiment, while the TAP module 220 is waiting for the data to return from the component object model (COM+) module 216, the TAP module 220 can halt the processing of instructions. Processing of the COMTAP processing route is described in greater detail later in connection with FIG. 4B.

The TAPCOMTAP processing route corresponds to data flow from the TAP module 220, to the component object model (COM+) module 216, and back to the TAP module 220 making the function call. For example, the TAPCOMTAP processing route can be used to send data to the component object model (COM+) module 216, have the component object model (COM+) module 216 perform some analytical computations with the data, and return a result to the TAP module 220. Processing of the TAPCOMTAP processing route is described in greater detail later in connection with FIG. 4C.

The COMTAPCOM processing route corresponds to data flow from the component object model (COM+) module 216, to the TAP module 220, and back to the component object model (COM+) module 216. The COMTAPCOM processing route can be used for the same purposes as the COMTAP processing route. In addition, the COMTAPCOM processing route permits data to return to the component object model (COM+) module 216 so that processing data collected by the TAP module 220 can be stored in the local database module 218 or the remote database module 202 and/or can be displayed in the database display device 204. Processing of the COMTAPCOM processing route is described in greater detail later in connection with FIG. 4D.

Using the Access Module 212

Figure 3:
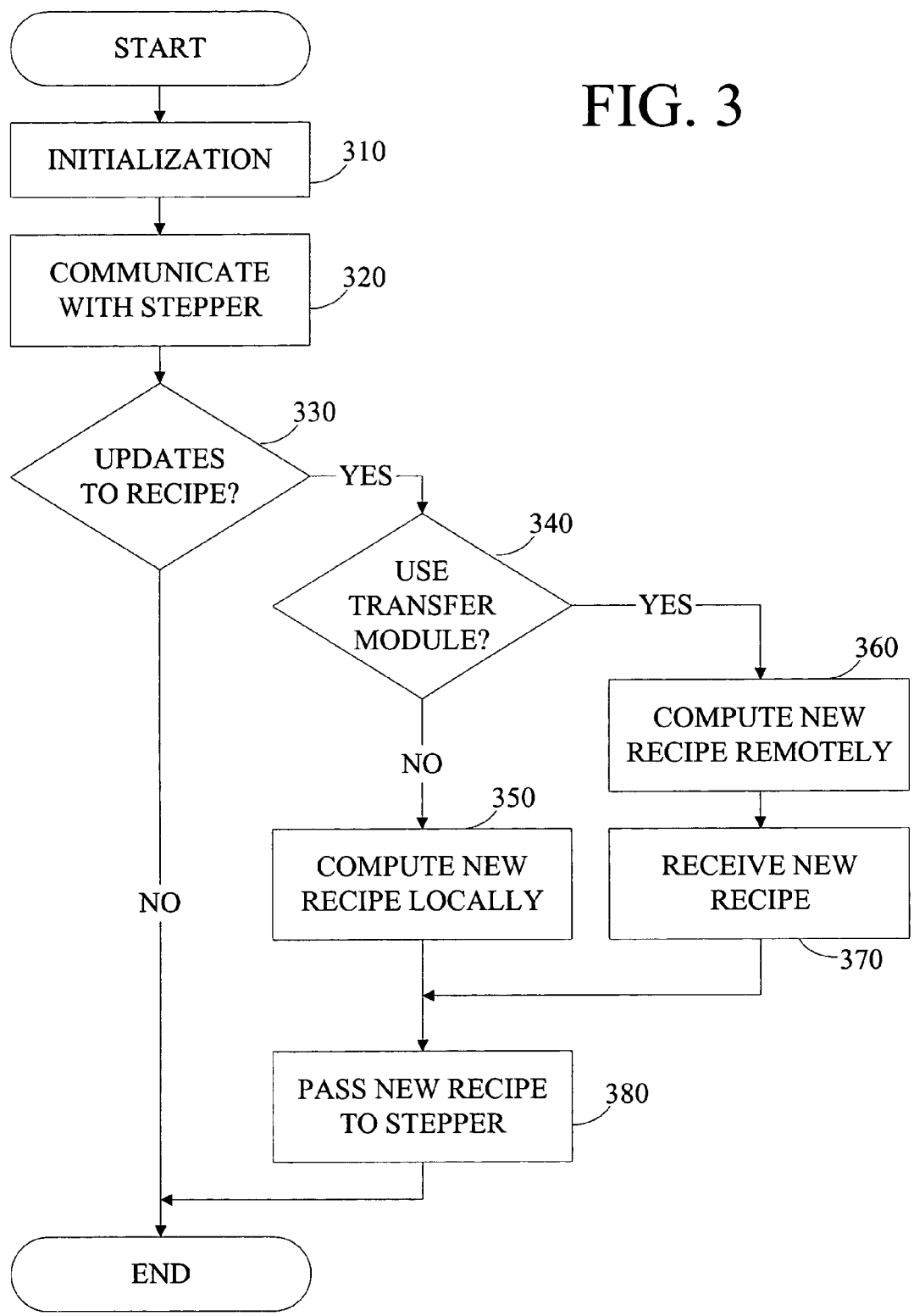
FIG. 3 is a flowchart illustrating an example of a process performed by an access module in the context of using a stepper.

FIG. 3 is a flowchart illustrating an example of a process performed by the access module 212 in the context of using a stepper. In one embodiment, the process performed by the access module 212 is specified by source code in the TAP module 220 corresponding to the stepper, and the source code is interpreted by an interpreter within the access module 212. In another embodiment, the TAP module 220 includes code that has been compiled. It will be understood that the principles described are also applicable to other types of manufacturing equipment 112. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like. The process begins at a first state 310, where the process initializes the stepper. The process advances from the first state 310 to a second state 320.

In the second state 320, the process communicates with the stepper to retrieve information such as an identifier for the stepper, the operational status of the stepper, the condition of a mask that may be in use by the stepper, and the like. The process advances from the second state 320 to a first decision block 330.

In the first decision block 330, the process determines whether there are updates to the recipe for the stepper. The process can communicate with the tool control system (TCS) 210 to determine whether a new recipe is to be used. The process can end if there is no new recipe. Otherwise, the process proceeds from the first decision block 330 to a second decision block 340 to compute the new recipe.

In the second decision block 340, the process determines whether to compute the recipe locally or remotely. In one embodiment, the process makes this determination by looking for a keyword in the source code, e.g., "FUNCTION." When the process is performed locally, i.e., when the source code in the TAP module 220 can calculate the new recipe, the process proceeds from the second decision block 340 to a third state 350, where such calculation takes place by the access module 212. When the process is to be performed remotely, the process proceeds from the second decision block 340 to a fourth state 360.

In the fourth state 360 the process transfers the corresponding parameters to the transfer module 214 for remote computation of the recipe. The transfer module 214 can perform the computations or can in turn transfer the computations to the routing module 224 and to the component object model (COM+) module 216 as specified in the source code. The process advances from the fourth state 360 to a fifth state 370.

In the fifth state 370, the process receives the new recipe from the transfer module 214 or from the component object model (COM+) module 216 via the transfer module 214. The process advances from the fifth state 370 to a sixth state 380.

In the sixth state 380, the process passes the new recipe to the stepper. The new recipe can be computed locally via the third state 350 or remotely via the fourth state 360. The process then ends and can be repeated as desired.

Using the Routing Module 224

Figure 4A:
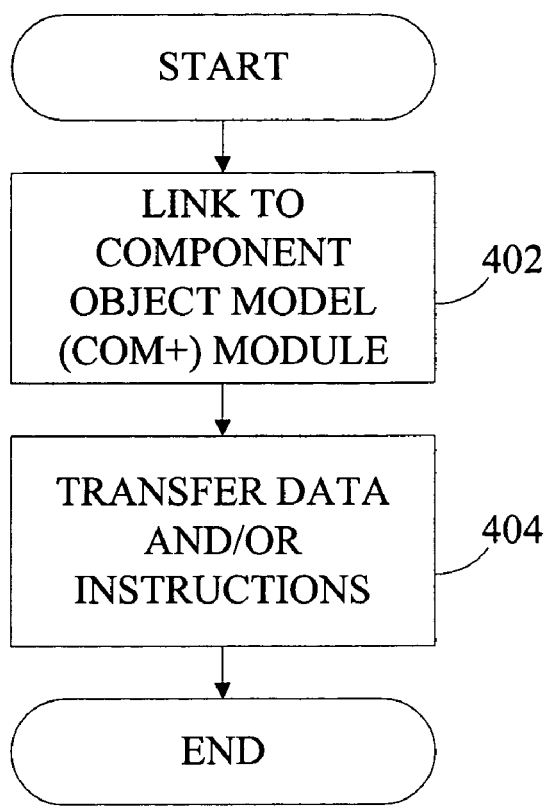
FIG. 4A is a flowchart generally illustrating a process performed by a routing module in response to a selection of a TAPCOM processing route.

FIG. 4A is a flowchart generally illustrating a process performed by the routing module 224 in response to a selection of a TAPCOM processing route. It will be appreciated by the skilled practitioner that the illustrated process can be modified in a variety of ways without departing from the spirit and scope of the invention. The process begins at a first state 402. In the first state 402, the routing module 224 links to the component object model (COM+) module 216 to use resources of the component object model (COM+) module 216. The process advances from the first state 402 to a second state 404.

In the second state 404, the process transfers data and/or instructions from the access module 212 to the component object model (COM+) module 216. When the transfer of information is complete, the process can remove the link to the component object model (COM+) module 216. It will be understood that the process can repeat in response to further calls specifying the TAPCOM processing route.

Figure 4B:
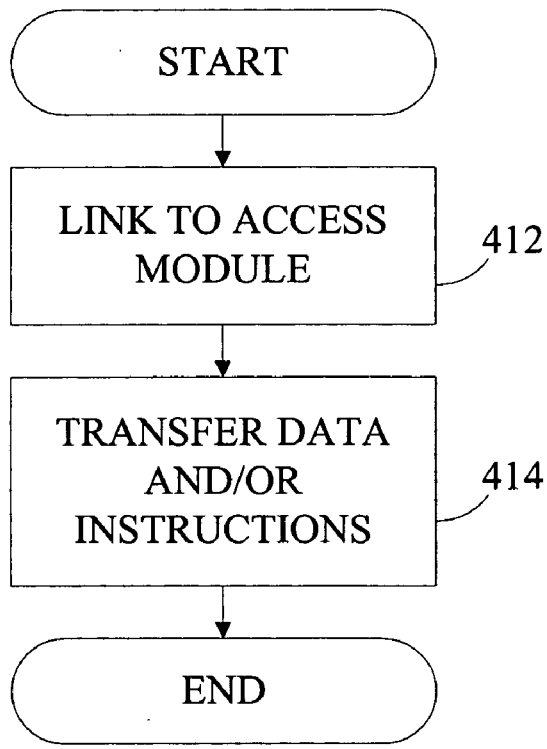
FIG. 4B is a flowchart generally illustrating a process performed by the routing module in response to a selection of a COMTAP processing path.

FIG. 4B is a flowchart generally illustrating a process performed by the routing module 224 in response to a selection of a COMTAP processing path. It will be appreciated by the skilled practitioner that the illustrated process can be modified in a variety of ways without departing from the spirit and scope of the invention. The process can be initiated by, for example, a user of the machine control system (MCS) 110. The process begins at a first state 412, where the process links to the access module 212. The process advances from the first state 412 to a second state 414.

In the second state 414, the process transfers data and/or instructions from the component object model (COM+) module 216 to the access module 212. The process can effectively transfer the data by, for example, providing an indication of where the data can be located, e.g., a filename, a memory address and byte range, a database record identifier, and the like. When the transfer of data is complete, the process can remove the link to the access module 212.

Figure 4C:
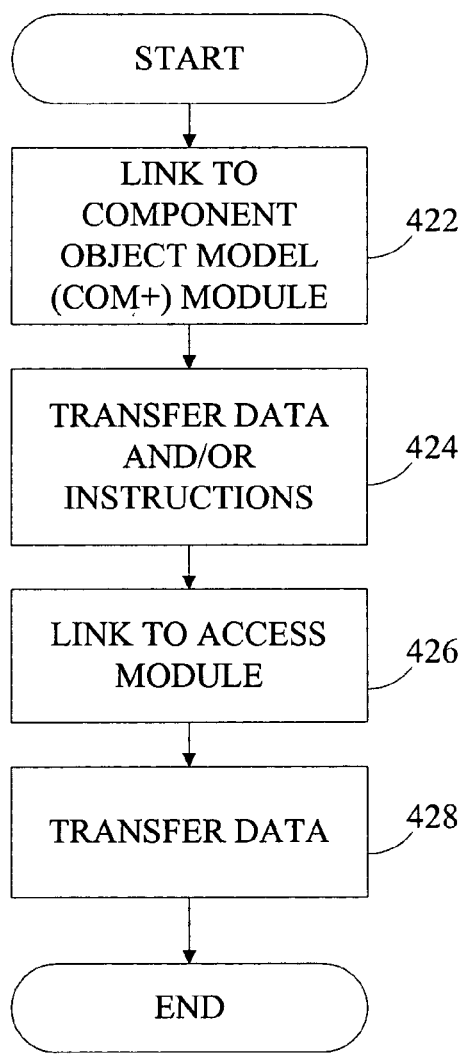
FIG. 4C is a flowchart generally illustrating a process performed by the routing module in response to a selection of a TAPCOMTAP processing path.

FIG. 4C is a flowchart generally illustrating a process performed by the routing module 224 in response to a selection of a TAPCOMTAP processing path. It will be appreciated by the skilled practitioner that the illustrated process can be modified in a variety of ways without departing from the spirit and scope of the invention. The process begins at a first state 422. In the first state 422, the routing module 224 links to the component object model (COM+) module 216 to use resources of the component object model (COM+) module 216. The process advances from the first state 422 to a second state 424.

In the second state 424, the process transfers data and/or instructions from the access module 212 to the component object model (COM+) module 216. When the transfer of information is complete, the process can remove the link formed in the first state 422 to the component object model (COM+) module 216. The process advances from the second state 424 to a third state 426. In one embodiment, the process waits to transition from the second state 424 to the third state 426 until the requested data is ready to be provided by the component object model (COM+) module 216. For example, the TAPCOMTAP processing route can be used to send data from the manufacturing equipment 112 to the component object model (COM+) module 216 for analysis of data, and then retrieve the analyzed data. The process can wait until the analyzed data is ready to be provided by the component object model (COM+) module 216. It will be understood that the readiness of the data can be determined in many ways, such as, for example, receiving an interrupt from the component object model (COM+) module 216, polling for a status flag, and the like.

In the third state 426, the process links to the access module 212 so that the process can return data and the like. The process advances from the third state 426 to a fourth state 428.

In the fourth state 428, the process transfers data from the component object model (COM+) module 216 to the access module 212. The process can effectively transfer the data by, for example, providing an indication of where the data can be located, e.g., a filename, a memory address and byte range, a database record identifier, and the like. When the transfer of data is complete, the process can remove the link to the access module 212.

Figure 4D:
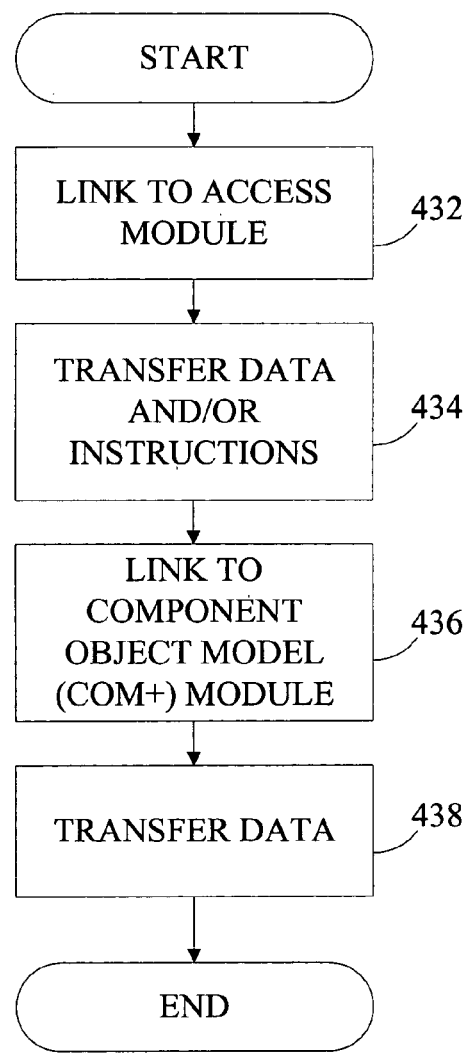
FIG. 4D is a flowchart generally illustrating a process performed by the routing module in response to a selection of a COMTAPCOM processing path.

FIG. 4D is a flowchart generally illustrating a process performed by the routing module 224 in response to a selection of a COMTAPCOM processing path. It will be appreciated by the skilled practitioner that the illustrated process can be modified in a variety of ways without departing from the spirit and scope of the invention. The process can be initiated by, for example, a user of the machine control system (MCS) 110. The process begins at a first state 432, where the process links to the access module 212. The process advances from the first state 432 to a second state 434.

In the second state 434, the process transfers data and/or instructions from the component object model (COM+) module 216 to the access module 212. When the transfer of data is complete, the process can remove the link to the access module 212. In one embodiment, the process waits to transition from the second state 434 to the third state 436 until the requested data is ready to be provided by the access module 212. For example, the COMTAPCOM processing route can be used to send commands to the manufacturing equipment 112, such as a command to stop a process. In addition, the COMTAPCOM processing route can be used to retrieve a status back from the manufacturing equipment 112, such as, for example, an indication of whether or not a particular process was performed successfully. The process may wait until the access module 212 has provided an indication that it has completed the task associated with the second state 434 before proceeding to the third state 436. It will be understood that the readiness of the data can be determined in many ways, such as, for example, receiving an interrupt from the access module 212, polling for a status flag, and the like.

In the third state 436, the routing module 224 links to the component object model (COM+) module 216 to return data to the component object model (COM+) module 216. The process advances from the third state 436 to a fourth state 438.

In the fourth state 438, the process transfers data from the access module 212 to the component object model (COM+) module 216. When the transfer of data is complete, the process can remove the link to the component object model (COM+) module 216.

Using the Component Object Model (COM+) Module

Figure 5A:
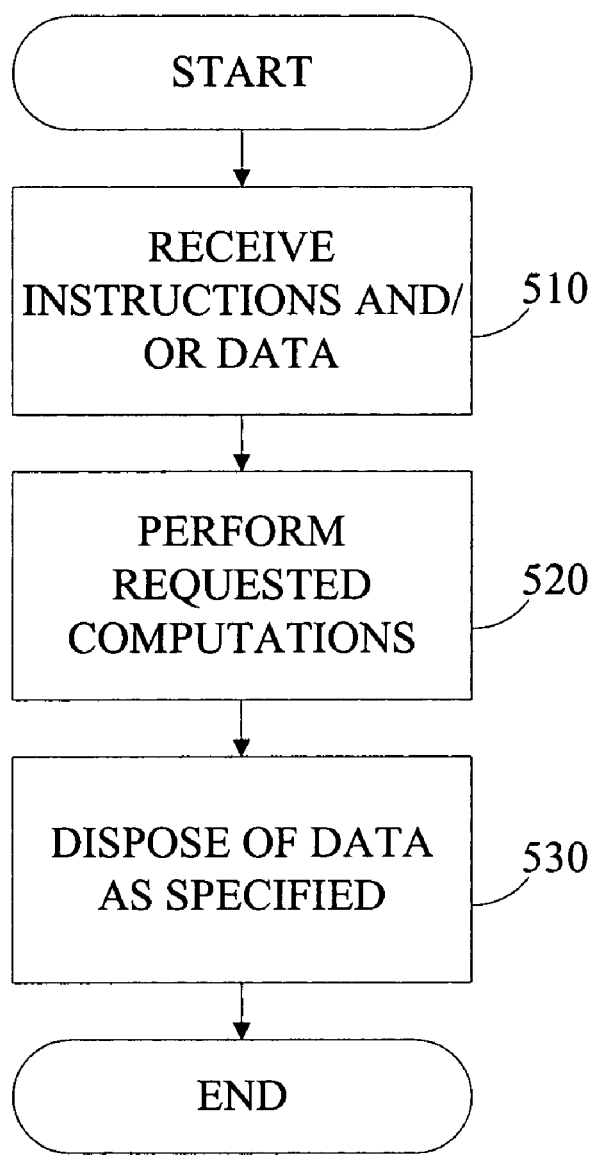
FIG. 5A is a flowchart generally illustrating a sample operation of a component object model (COM+) module in response to processing for a TAPCOM or a TAPCOMTAP processing route.

FIG. 5A is a flowchart generally illustrating a sample operation of the component object model (COM+) module 216 in response to processing for a TAPCOM or a TAP-COMTAP processing route. For example, the TAPCOM or the TAPCOMTAP processing route can be specified by an instruction that is interpreted by access module 212. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like. The process begins at a first state 510.

In the first state 510, the process receives instructions and/or data from the access module 212. It will be understood that the instructions and/or data can also reference other data, such as data that is resident in the local database module 218 or in the remote database module 202. The process advances from the first state 510 to a second state 520.

In the second state 520, the process performs the tasks specified by the instruction, uses the data provided, and the like. These tasks can include statistical analysis and the like. The process advances from second state 520 to a third state 530 when the tasks are ready.

In the third state 530, the process disposes of the data as specified. For example, where the processing route specified by the instruction is a TAPCOM processing path, the process can store the computed results in the local database module 218 or in the remote database module 202, can display the calculated result in the database display device 204, and the like. In another example, where the processing route specified by the instruction is a TAPCOMTAP processing path, the process can further return the calculated result to the access module 212 via the routing module 224.

Figure 5B:
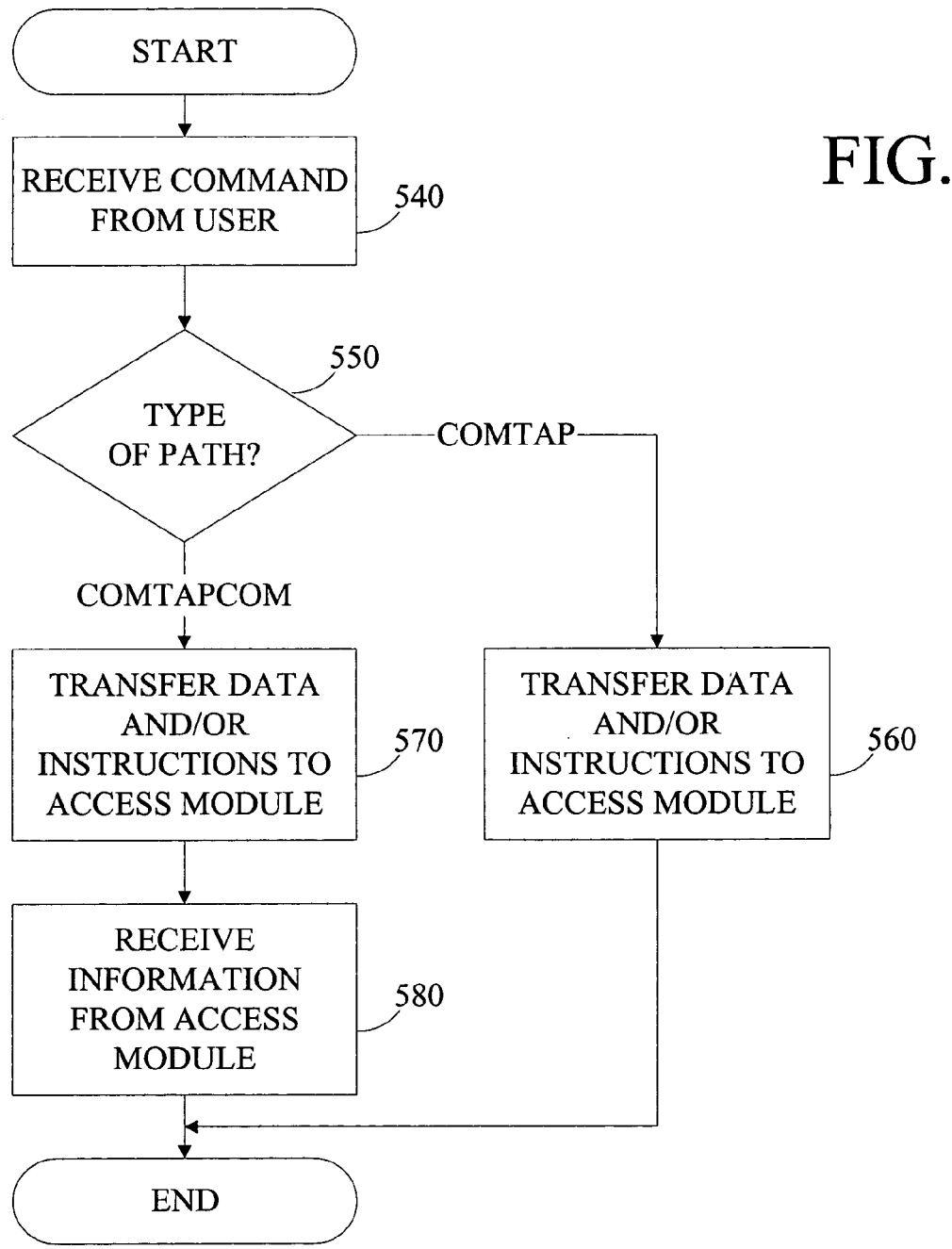
FIG. 5B is a flowchart generally illustrating a sample operation of the component object model (COM+) module in response to processing for a COMTAP or a COMTAPCOM processing route.

FIG. 5B is a flowchart generally illustrating a sample operation of the component object model (COM+) module 216 in response to processing for a COMTAP or a COMTAPCOM processing route. It will be appreciated by the skilled practitioner that the illustrated process can be modified in a variety of ways without departing from the spirit and scope of the invention. For example, in another embodiment, various portions of the illustrated process can be combined, can be rearranged in an alternate sequence, can be removed, and the like. The process starts at a first state 540.

In the first state 540, the process receives a command or instruction from the user of the machine control system 110. It will be understood that the user can be, but does not have to be, a human being. The command can be received from a data entry device, such as a mouse device or a keyboard, or can be received from another computer system. The process advances from the first state 540 to a decision block 550.

In the decision block 550, the process determines whether the processing route selected corresponds to the COMTAP processing route or to the COMTAPCOM processing route. The process proceeds from the decision block 550 to a second state 560 when the processing route corresponds to COMTAP. Otherwise, the process proceeds from the decision block 550 to a third state 570.

In the second state 560, the process transfers data and/or instructions that are selected by the user to the access module 212. For example, the data can correspond to a command to the manufacturing equipment 112 to shut down. The process then ends.

In the third state 570, the process also transfers the data and/or instructions as selected by the user from the component object model (COM+) module 216 to the access module 212. The process can then wait before proceeding from the third state 570 to a fourth state 580 until the requested action is completed by the access module 212.

In the fourth state 580, the process receives the designated information from the access module. For example, the information can correspond to whether a selected command had been successfully executed by the manufacturing equipment. The process then ends and can be repeated as desired.

Various embodiments of the invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. A machine control system (MCS) comprising:
a tool control system (TCS) configured to communicate with a manufacturing execution system (MES) that is coupled to the machine control system (MCS) to receive instructions from the manufacturing execution system (MES) and to provide status from the machine control system (MCS);
an access module configured to communicate with the tool control system (TCS) and the manufacturing equipment (MES), where the access module includes an interpreter for interpreting source code of a TAP module, where the source code of the TAP module is adapted to control the manufacturing equipment;
a transfer module in communication with the access module, where the transfer module is linked by the access module when the source code of the TAP module specifies a function that is external to the access module, where the transfer module is further configured to route selected functions in response to a processing route specified by the instruction; and
a component object model (COM+) module in communication with the transfer module, where the component object model (COM+) module is further adapted to process source code that is formatted in a component object model format.

2. The machine control system (MCS) as defined in claim 1, wherein the manufacturing equipment corresponds to equipment for semiconductor fabrication.

3. The machine control system (MCS) as defined in claim 1, wherein the transfer module comprises:
   an advanced transfer module configured to determine whether to compute a function or to forward the instruction to the component object model module; and
   a routing module configured to control the passage of information between the access module and the component object model module.

4. The machine control system (MCS) as defined in claim 3, wherein the access module, the advanced transfer module, and the routing module comprise DLL files, and where the component object model module comprises files in a component object model format.

5. The machine control system (MCS) as defined in claim 1, wherein the source code of the TAP module includes both instructions that can be interpreted and executed by the access module and includes instructions which call functions external to the access module.

6. The machine control system (MCS) as defined in claim 1, wherein the transfer module is responsive to at least one of four processing routes selected from TAPCOM, COMTAP, TAPCOMTAP, and COMTAPCOM, where TAPCOM corresponds to data flow in one direction from the TAP module to the component object model module, where COMTAP corresponds to data flow in one direction from the component object model module to the TAP module, where TAPCOMTAP corresponds to data flow from the TAP module, to the component object module model, and back to the TAP module, and where the COMTAPCOM processing route corresponds to data flow from the component object model module, to the TAP module, and back to the component object model module.

7. The machine control system (MCS) as defined in claim 6, wherein the transfer module is further configured to wait while processing an instruction with a TAPCOMTAP processing route, where the wait begins when the component object model module is provided with information, and where the wait ends after the component object model module is ready to provide data.

8. The machine control system (MCS) as defined in claim 6, wherein the transfer module is configured to wait while processing an instruction with a COMTAPCOM processing route, where the wait begins when the TAP module is provided with information, and where the wait ends when the TAP module is ready to provide requested data.

9. A method of controlling manufacturing equipment, the method comprising:
   communicating with a manufacturing execution system (MES) to determine whether a new recipe is to be used;
   receiving a first set of parameters relating to the new recipe from the manufacturing execution system (MES);
   controlling a piece of manufacturing equipment according to a first set of instructions;
   encountering an instruction in the first set of instructions that is related to the new recipe;
   linking to a component object model module to transfer the first set of parameters to the component object model module; and
   waiting until computation by the component object model module of a second set of parameters is complete, where the second set of parameters is calculated from the first set of parameters and can be directly used by the manufacturing equipment.

10. The method as defined in claim 9, wherein the manufacturing equipment is manufacturing equipment for semiconductor fabrication.

11. The method as defined in claim 9, further comprising executing code in the component object model module that has been written in a component object model format.

12. The method as defined in claim 11, wherein controlling the piece of manufacturing equipment is performed in a first operating system, and wherein the code that is executed in the component object model module is generated in a second operating system different from the first operating system.

13. The method as defined in claim 12, wherein the first operating system is IBM® OS/2® and the second operating system is Microsoft® Windows®.

14. The method as defined in claim 13, further comprising using executable code generated by at least one of Visual Basic®, Java, and C++ for the code that is executed in the component object model module of the second operating system.

15. The method as defined in claim 9, wherein controlling the piece of manufacturing equipment corresponds to interpreting source code.

16. A method for controlling the processing path of a computer instruction, the method comprising:
   receiving an instruction from a TAP module that specifies execution of a function remote from an access module in which the TAP module executes, where the TAP module controls the processing of a piece of manufacturing equipment;
   inspecting the instruction for a corresponding parameter that specifies a processing path for the remote execution;
   linking to a component object model module that has executable code for the function and providing the component object model module with corresponding information when the parameter specifies a processing path from the TAP module to the component object model; and
   linking to the component object model module that has executable code for the function, providing the component object model module with corresponding information, waiting for the component object model module to complete calculation of the function, linking to the access module that executes code from the TAP module when the component object model module is ready to provide data, and providing results of the calculation when the parameter specifies a processing path that flows from the TAP module, proceeds to the component object model module, and returns to the TAP module.

17. The method as defined in claim 16, wherein the corresponding information provided to the component object model module includes data and instructions.

18. The method as defined in claim 16, further comprising:
   receiving an instruction from the component object model module for a function that is to be performed in the TAP module; and
   linking to the access module and providing the access module with corresponding information such that the TAP module can use the provided information when the parameter specifies a processing path from the component object model module to the TAP module.

19. The method as defined in claim 16, further comprising:
   receiving an instruction from the component object model module for a function that is to be performed in the TAP module, where the instruction further specifies a return of a second information from the TAP module; and
   linking to the access module and providing the access module with a first information such that the TAP module can use the first information, waiting until the TAP module is ready to provide the second information, receiving the second information from the access module, and providing the second information to the component object model module when the parameter specifies a processing path that flows from the component object model module, proceeds to the TAP module, and returns to the component object model module.

20. The method as defined in claim 16, wherein the TAP module corresponds to source code, and where the access module executes the source code by interpreting the source code of the TAP module.

21. The method as defined in claim 16, wherein the piece of manufacturing equipment corresponds to semiconductor fabrication equipment.

22. A computer-readable medium having computer-executable instructions for performing a method comprising:
   receiving an instruction from a TAP module that specifies execution of a function remote from an access module in which the TAP module executes, where the TAP module controls the processing of a piece of manufacturing equipment;
   inspecting the instruction for a corresponding parameter that specifies a processing path for the remote execution;
   linking to a component object model module that has executable code for the function and providing the component object model module with corresponding information when the parameter specifies a processing path from the TAP module to the component object model; and
   linking to the component object model module that has executable code for the function, providing the component object model module with corresponding information, waiting for the component object model module to complete calculation of the function, linking to the access module that executes code from the TAP module when the component object model module is ready to provide data, and providing results of the calculation when the parameter specifies a processing path that flows from the TAP module, proceeds to the component object model module, and returns to the TAP module.

23. The computer-readable medium as defined in claim 22, further comprising computer-executable instructions for performing a method comprising:
   receiving an instruction from the component object model module for a function that is to be performed in the TAP module; and
   linking to the access module and providing the access module with corresponding information such that the TAP module can use the provided information when the parameter specifies a processing path from the component object model module to the TAP module.

24. The computer-readable medium as defined in claim 22, further comprising computer-executable instructions for performing a method comprising:
   receiving an instruction from the component object model module for a function that is to be performed in the TAP module, where the instruction further specifies a return of a second information from the TAP module; and
   linking to the access module and providing the access module with a first information such that the TAP module can use the first information, waiting until the TAP module is ready to provide the second information, receiving the second information from the access module, and providing the second information to the component object model module when the parameter specifies a processing path that flows from the component object model module, proceeds to the TAP module, and returns to the component object model module.

* * * * *